V. G. APPLE.
POWER TRANSMISSION GEARING.
APPLICATION FILED JUNE 15, 1911.
1,040,604.
Patented Oct. 8, 1912.
2 SHEETS—SHEET 2.
Fig. 3.
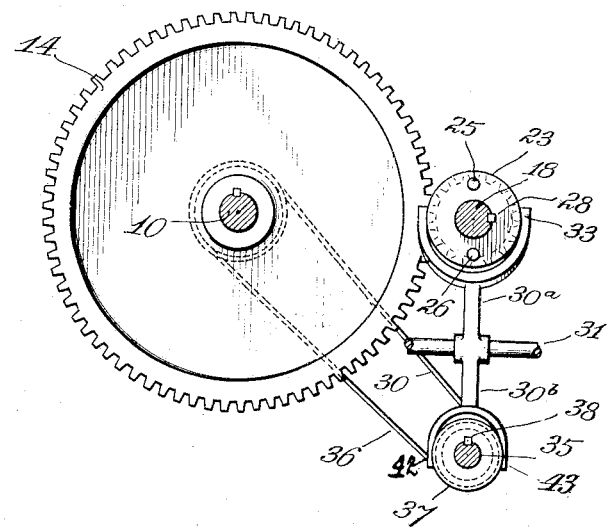
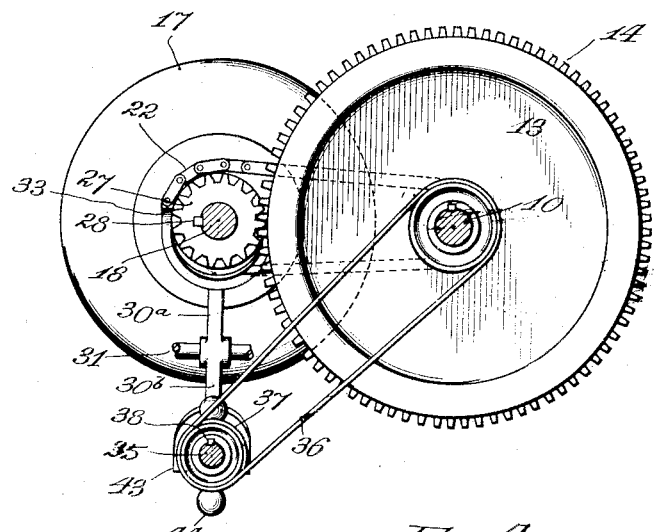
Fig. 4.
Witnesses:
Robert H. Weir
A. H. Rabsay
Inventor:
Vincent G. Apple,
by Toulé Bain May
his Attys

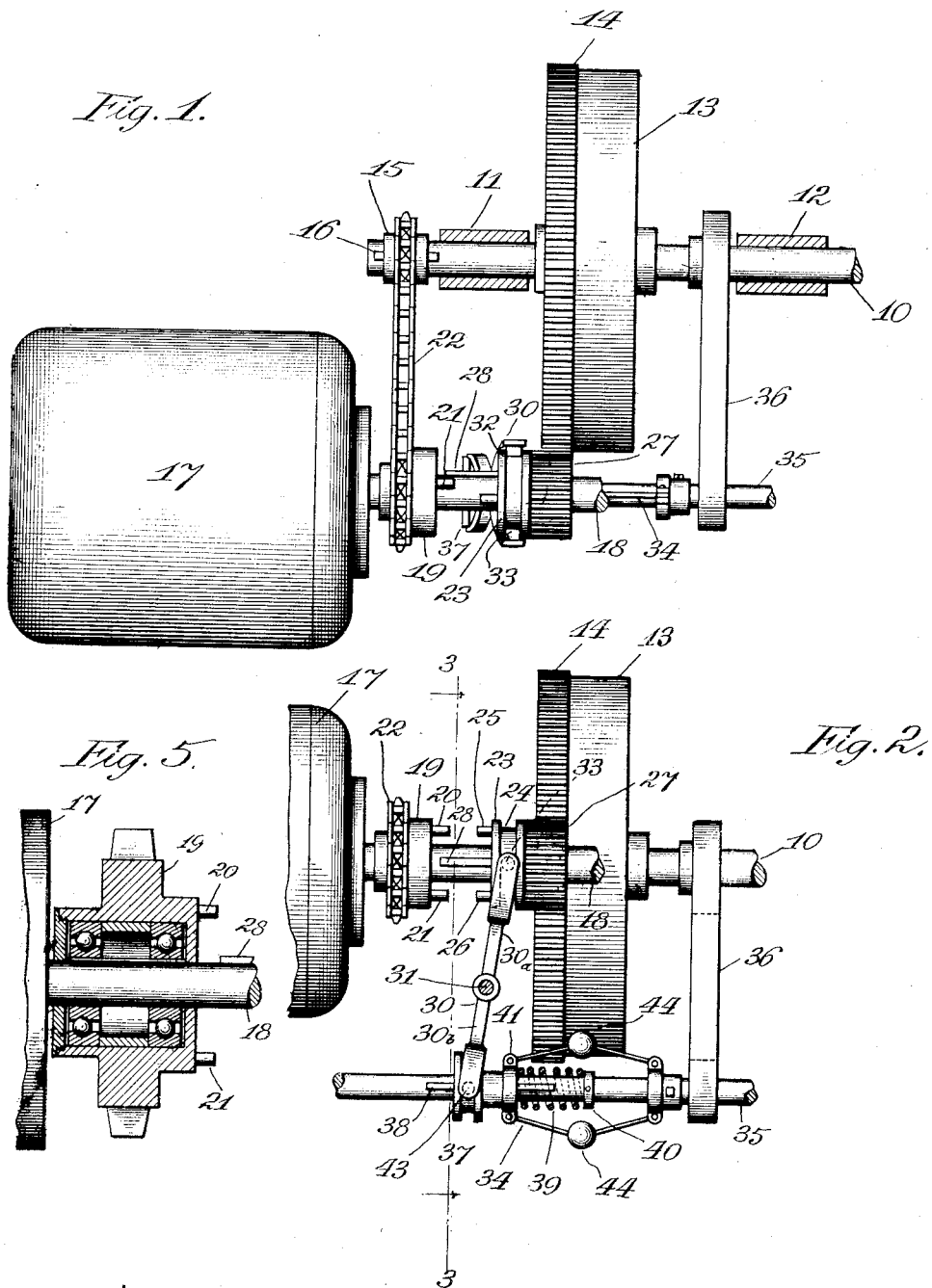

UNITED STATES PATENT OFFICE.

VINCENT G. APPLE, OF DAYTON, OHIO.

POWER-TRANSMISSION GEARING.

1,040,604.  Specification of Letters Patent.  Patented Oct. 8, 1912.

Application filed June 15, 1911. Serial No. 633,234.

*To all whom it may concern:*

Be it known that I, VINCENT G. APPLE, a citizen of the United States, residing at Dayton, in the county of Montgomery and State of Ohio, have invented certain new and useful Improvements in Power-Transmission Gearing, of which the following is a specification.

My invention relates to power transmission gearing.

One of the objects of my invention is to provide a power transmission gearing for intervention between two power translating instrumentalities, whereby, one of said instrumentalities may thereby drive the other at a given speed relation and by a simple change in the coupling of said gearing, automatically accomplished, or otherwise, the driven instrumentality, in the first example, is made capable of driving the former instrumentality at a different speed relation.

My system of gearing is especially applicable, and advantageous, for transmitting power from an internal combustion engine to a dynamo electric machine and vice versa. It is capable of change of performance respectively suitable for these inter-dependent and associated devices.

As illustrative of the value of my form of gearing, it may be stated that automobile practice offers an especially advantageous situation wherein it may be used with resulting advantage and convenience.

Automobile structures usually include internal combustion, propelling, engines, that must be, initially, set in motion, or started, by some extraneous power, and usually associated with such an engine, is a dynamo electric machine and storage batteries, for furnishing electric current to be used for various purposes in and about such vehicles, such as, for instance providing means for producing the sparks for ignition; furnishing current for electric lamps; blowing or operating signal bells and horns, etc. In such installations the engine drives the dynamo, which charges the battery and these devices coöperatively or separately supply electric current for the various uses. A dynamo, of the type usually found associated with such engines and batteries, will operate as a power motor, when furnished with current from the battery, and it will rotate, in the same direction, as the motor as it is rotated when producing current as a generator and it is this dual function of the dynamo, through the operation, and by the association, of my improved gearing that I utilize to initially start the engine and subsequently, as a result of the peculiar characteristics of my gearing adapt the dynamo to be driven by the engine as a generator.

The change of the dynamo, operating as a motor for driving the engine, to a condition wherein the engine drives the dynamo as a generator, may be effected automatically or by hand manipulation as may be desired, the change being so harmonious as to be without interruption of the functions of either of the translating devices in the performance of their respective service.

In the exemplification illustrated, Figure 1 is a plan view of my improved gearing, showing the dynamo electric machine and the engine shaft connected thereby. Fig. 2 is a side elevation of the same. Fig. 3 is a section taken on line 3—3 of Fig. 2. Fig. 4 is an end view looking toward the left in Fig. 2. Fig. 5 is an enlarged central sectional view of the driving sprocket on the dynamo shaft.

In all the views the same reference characters indicate similar parts.

The shaft of an internal combustion engine, is represented by 10. The operation and characteristics of such engines is so generally known that I have deemed it unnecessary to show more than the main shaft thereof with conventional bearings 11 and 12. The usual fly wheel 13 is secured to the shaft 10 and in association with the said fly wheel is a gear wheel 14, which may be connected to the fly wheel, or may be an integral part thereof. To the out board end of the shaft 10 is a sprocket wheel 15.

17 is a dynamo electric machine, adapted to be driven by the engine, for furnishing electric current, for purposes heretofore stated.

Loosely mounted on the shaft, 18, of the dynamo electric machine, is a ball bearing sprocket wheel 19 provided on its outer face with a clutch member, consisting of projecting pins or studs 20—21. An associated clutch member 23, grooved as at 24, is provided with co-acting, projecting, clutch pins, or lugs, 25 and 26. To the opposite end of the clutch 23 is secured a pinion 27, which, if desired may be made an integral part of the clutch. It is adapted to mesh, for driving association with the gear wheel 14. The clutch member 23 is capable of longitudinal movement on the shaft 18, but is in positive rotatable relation therewith, by means of the key 28.

With the parts in the positions shown in Figs. 1 and 2, if the dynamo shaft 18 be rotated, the pinion 27, will drive the gear wheel 14 with which it is in mesh, and the gear wheel 14 will rotate the shaft 10. At this time there is no driving relation between the shaft 10 and shaft 18 by way of the sprocket wheel 19 which, as heretofore explained, is loose on the shaft 18, and can be connected thereto only when its clutch pins 20 and 21 are in driving relation with corresponding members 25 and 26 of the clutch 23. When the pinion 27 is in meshed engagement with the gear wheel 14, the clutch members, just mentioned, are in separated relation. Now if the clutch member 23 be shifted on the shaft 18, until the members 25 and 26 thereof make driving connections with corresponding members 20 and 21, then the wheel 27 will have been moved so far to the left as to no longer make driving connections with the gear wheel 14. It may be stopped in mid position and not make engagement with either the clutch member or the gear wheel if desired.

By sliding the clutch member 23, on the shaft, 18, for changing the driving relations between the shafts 10 and 18, I provide a bifurcated, pivoted, lever 30, pivoted as at 31, and provided with projecting pins or lugs 32 and 33 that engage in the annular groove 24 of the clutch member 23, and therefore when the end of the pivoted lever 30, is moved, laterally, the clutch member 23 will be thereby slid upon the shaft 18, and cause the pins 35 and 36 to engage corresponding pins 20 and 21 of the sprocket wheel 19 and at the same time cause disengagement of the pinion, 27, and the gear wheel 14, and when moved in the opposite direction cause the reëngagement of the pinion 27 and the gear wheel 14 and the disengagement of the pins.

In starting a gas engine it is only necessary that the shaft shall be rotated at a relatively slow speed and, therefore, it will be observed, from the proportions of the pinion 27 and the gear wheel 14, that the shaft, 18, must make a number of revolutions, probably eight or ten before the shaft 10 is rotated one revolution, and that in the gearing arrangement for driving the dynamo direct, through the instrumentality of the clutch members, heretofore referred to, the difference in number of revolutions of the shafts 18 and 10 is much less.

In the operation of the device, for the purpose of starting the engine, the pinion 27 is placed in mesh with the gear wheel 14, as shown in Figs. 1 and 2, and the dynamo 17 is connected with the storage battery so that it thereby becomes a motor and rotates the shaft 18 at a relatively high speed compared with the shaft 10. The shaft 10 is thus rotated until the engine begins to become self operated, when the speed of the shaft, 10, will thereby become accelerated and the clutch member 23 may be moved, along the shaft 18, until pinion 27 and gear wheel 14 are disengaged and the clutch member 23 makes engagement with the clutch member of the sprocket wheel 19, thereby directly connecting the shaft 18 with said sprocket wheel 19 and establishing a relation where the shaft, 10, now drives the dynamo. Thus, it will be seen that in the first instance of the example, the dynamo was operated as a motor and drove the shaft 10 until the engine associated with shaft 10 became self operated, and that when the clutch members are shifted, the engine becomes the driving instrumentality and drives the dynamo, as a generator, for the purpose of producing current to be used in connection with the engine and other parts of the vehicle. When starting the engine said transposition of the gearing mechanism should properly take place at a predetermined velocity of the engine shaft, or, at about the time when the engine becomes self operative, and I prefer, therefore, to provide a fly ball speed governor, 34, properly mounted on one of the shafts of the device. While it may be applied directly to the dynamo shaft, I have herein, for ease of illustration, shown the provision of a shaft 35 driven from the engine shaft 10, by a belt 36.

A grooved collar 37 is slidably mounted on the shaft 35, and is positively rotated therewith, by means of the key, 38. An open compression spring, 39, surrounds the shaft, 35, and abuts against the collar 40, which is secured to the said shaft, and also against the sliding collar 37 as at 41. The spring, 39, normally holds the parts in positions shown in Figs. 1 and 2, wherein the pinion, 27, is in mesh with the engine wheel 14, and this condition continuously exists during the time when the engine remains inactive, thus placing the parts always in position, ready for starting the engine, in the manner heretofore described.

The end 30$^b$ of the lever 30, is bifurcated just as the end 30$^a$ is bifurcated, each prong being provided with internally projecting lugs or pins 42 and 43, that engage the groove in the sliding collar 37 so that when the collar 37 is slid along the shaft 35, to the left, the clutch member 23 will be simultaneously slid along shaft 18 to the right.

The operation of the device is as follows: When the electric current is turned on the dynamo, assuming the engine to be idle, the shaft 18, is immediately rotated by means of the pinion 27, and the gear wheel 14 on the shaft 10 is rotated at a relative speed determined by the relative diameters of the pinion 27 and gear wheel 14. After the shaft 10 has been turned over several times the engine becomes self operated and very quickly accelerates its speed, thereby causing the centrifugal fly ball governor 34, to distend, or throw out, its inertia weights 44—44 and thereby draw the collar 37, toward the right, against the tension of the spring, 39, moving the lever 30, and causing disengagement of the pinion 27 with the gear wheel 14 and engagement of the clutch members 19, and 23, so that, by such operation, the dynamo, 17, becomes the driven element, through the instrumentality of the sprocket wheel, 15, on the shaft 10, and the connecting chain, 22. When the engine is stopped, or becomes inactive, spring 39, pushes the collar 37, along the shaft and thereby the clutch members are again automatically placed in the positions shown in Fig. 2.

It is obvious that the collar 37 may be hand operated or provided with a hand lever instead of being operated automatically by the centrifugal governor.

While I have herein described and illustrated a single embodiment of my invention, it is evident that many changes may be made therein without departure from the scope of the appended claims.

What I claim is:

1. In a power transmission gearing, the combination with a dynamo shaft and an engine shaft, of normally effective gear-and-pinion connections between said shafts, a member of said connections being movable to disconnect said shafts, a sprocket wheel upon each of said shafts, one of said sprocket wheels being loosely mounted upon its shaft, a chain connecting said sprocket wheels, normally disengaged means of connection between said loosely mounted sprocket and its shaft, adapted and arranged to make effective connection between said sprocket and shaft upon movement of the movable part of said gear-and-pinion connections, and speed-responsive means automatically operable to move said movable part of said gear-and-pinion connections.

2. In a power transmission gearing, the combination with a dynamo shaft and an engine shaft, of gearing connections between said shafts comprising a pinion upon one of said shafts rotatable therewith and longitudinally slidable thereon to a position out of effective engagement with the coacting gear wheel, and yielding means normally to hold said slidable pinion in effective engaging position; other connections to connect said shafts for rotation in a different speed relation, including a member loosely mounted upon the shaft which supports the slidable pinion, having connections for rotation from the other shaft; and clutch means between said loosely mounted member and the slidable pinion, normally disengaged and adapted and arranged for effective engagement upon disengagement of pinion from the gear wheel.

3. In a power transmission gearing, a dynamo shaft, a gearing member mounted for rotation with respect to, but longitudinally fixed upon, said shaft; a gearing member mounted for longitudinal movement, but rotatably fixed, upon said shaft; a clutch member upon each of said gearing members arranged to be out of engagement when the longitudinally movable member is in one position and to engage when said movable member is in another position; an engine shaft; and gearing members thereon, coacting respectively with the longitudinally movable and fixed gearing members of the dynamo shaft, the longitudinal movement of said movable gearing member to clutch-engaging position disengaging said gearing member from its coacting member upon the engine shaft.

4. In a gearing mechanism, the combination with an engine shaft and a dynamo shaft, of gearing members fixed upon the engine shaft; coacting gearing members upon the dynamo shaft, respectively mounted to be longitudinally fixed and rotatably loose and to be longitudinally shiftable and rotatably fixed, upon said shaft; clutch means between said rotatably fixed and rotatably loose gearing members; and speed responsive means adapted and arranged to move said rotatably fixed member out of engagement with its coacting gearing member and into engagement with said rotatably loose member.

5. In a gearing mechanism, the combination with an engine shaft and a dynamo shaft, of gear-and-pinion connections between said shafts, the pinion being longitudinally movable out of engagement with the coacting gear wheel, a spring normally holding said movable pinion in position of engagement with said gear, speed responsive means for moving said pinion out of engagement therewith, and other connections between said shafts arranged to be normally ineffective and made effective by coaction of said movable pinion member therewith.

In testimony whereof I hereunto set my hand in the presence of two witnesses.

VINCENT G. APPLE.

In the presence of—
E. V. MARTIN,
N. E. SNYDER.